Figure 1A:
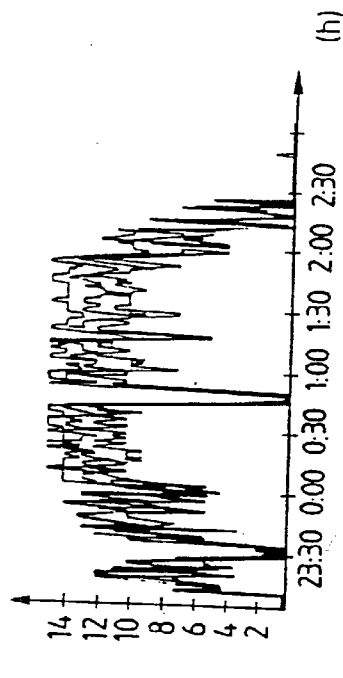
Figure 1B:
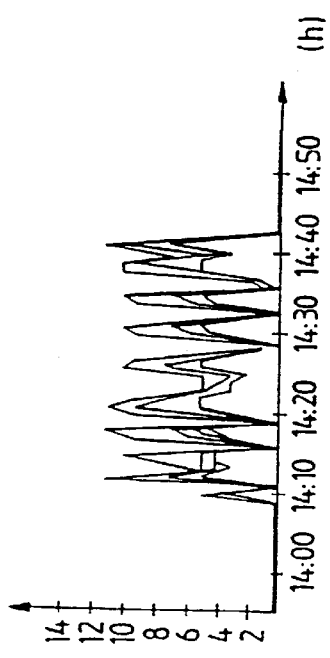
Figure 1C:
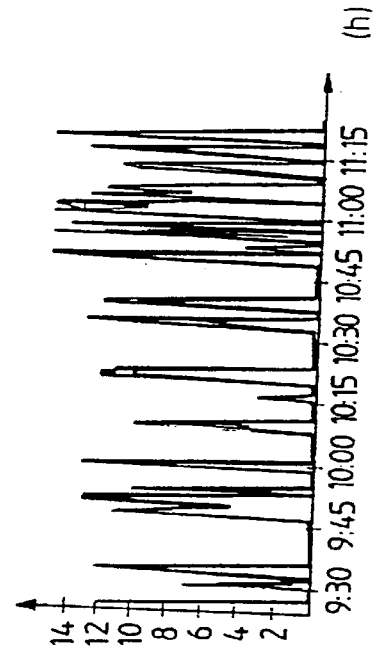
Figure 1D:
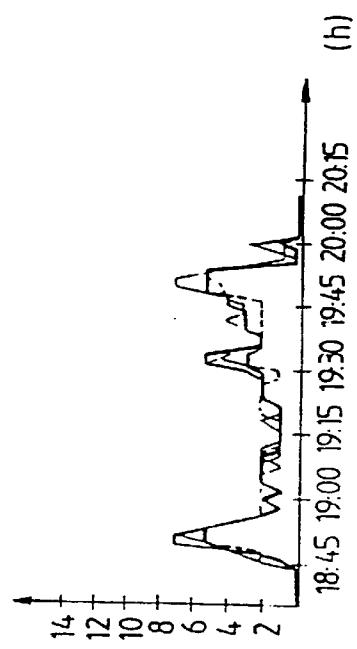

United States Patent [19]
Rompe

[11] Patent Number: 5,903,856
[45] Date of Patent: May 11, 1999

[54] DEVICE AND METHOD FOR MONITORING THE TRANSIT TIME OF TRANSPORTED ARTICLES

[75] Inventor: André Rompe, Berlin, Germany

[73] Assignee: Siemens Aktiengesellschaft, Munich, Germany

[21] Appl. No.: 08/693,094

[22] PCT Filed: Feb. 9, 1995

[86] PCT No.: PCT/EP95/00469

§ 371 Date: Dec. 16, 1996

§ 102(e) Date: Dec. 16, 1996

[87] PCT Pub. No.: WO95/22061

PCT Pub. Date: Aug. 17, 1995

[30] Foreign Application Priority Data

Feb. 10, 1994 [DE] Germany ............................. 44 04 195

[51] Int. Cl.$^6$ ...................................................... G06F 7/00
[52] U.S. Cl. .................... 702/176; 702/182; 364/468.15; 364/528.31
[58] Field of Search ..................................... 364/569, 566, 364/559, 576, 550, 468.15, 528.31, 528.32, 528.33; 73/488, 489, 491, 510, 511; 702/176, 182

[56] References Cited

U.S. PATENT DOCUMENTS

| | | | |
|---|---|---|---|
| 4,114,450 | 9/1978 | Shulman et al. | ............................ 73/489 |
| 4,561,057 | 12/1985 | Haley, Jr. et al. | ........................ 364/550 |
| 5,065,322 | 11/1991 | Mazur et al. | ........................ 364/424.05 |
| 5,502,656 | 3/1996 | Fulcher et al. | ............................ 364/550 |

FOREIGN PATENT DOCUMENTS

| | | |
|---|---|---|
| 3643203 | 6/1988 | Germany . |
| 4110891 | 10/1991 | Germany . |
| 59-183372 | 10/1984 | Japan . |

OTHER PUBLICATIONS

"Begleitschutz für wertvolle Güter". In: Markt & Technik, No. 10, Mar. 9, 1979.

Primary Examiner—John Barlow
Assistant Examiner—Bryan Bui
Attorney, Agent, or Firm—Venable; George H Spencer

[57] ABSTRACT

In a device and a method for monitoring the transit time of transported articles, in which the movement of a consignment is recorded by a monitoring system acceleration sensor of which the measured values are stored and delivered to an evaluation arrangement, a predetermined number of K frequency spectra are determined in each predetermined cycle period T in order to give predetermined number of N measured values in each case, the K frequency spectra are integrated, and the integrated frequency spectra are stored in a memory.

17 Claims, 4 Drawing Sheets

DEVICE AND METHOD FOR MONITORING THE TRANSIT TIME OF TRANSPORTED ARTICLES

DESCRIPTION

The present invention relates to the area of monitoring the transit time of transported articles.

So-called transit time testing devices are typically used to check the transit time of mail consignments; these devices are shipped along with the mail consignments to be transported, and include apparatuses that register the course of movement of the consignments. The known apparatuses of this type include a movement sensor that registers the movement over the entire shipping time of the consignment. Forces that occur during transport act on the sensor, whose measured values are stored in a movement-time diagram. If the consignment is not moving, that is, no transport is taking place, no recording is effected, either. With these apparatuses, it can be determined whether, following transport lasting several hours, for example, the consignment has not moved at all in several days in an unacceptable manner.

The movement-time diagram recorded by the transit time testing device can be evaluated in a central location, and it is possible to localize possible stops in the delivery or shipping by using a nominal/actual comparison, because the transport paths and transit times are known for a standard case. A transit time monitoring device is also already known which has a memory for collecting the measured values, and evaluation electronics, and in which the movement sensor, the memory for the measured values and the evaluation electronics are disposed on a partially-flexible base and corresponding in thickness to the standard letter thickness, $\mu$ 5 mm. This transit time monitoring device is configured such that it can be processed in letter-sorting machines and is not rejected in the processing machines in the post offices.

A method and apparatus for monitoring the impact stress of transported articles is known from Markt Und Technik [Market and Technology], No. 10, of Mar. 9, 1979, pages 60–62. This apparatus has an acceleration sensor, whose measured values are supplied in stored form to an evaluation device. In the process, the signals of the three components x, y and z are integrated. The integrated values are stored in a memory. The auxiliary values are digitized.

The known apparatuses have the drawback that they only permit detection of the status of movement and rest, without offering a more precise distinction between the types of movement or transport means used that actually occur in a state of movement.

It is the object of the invention to disclose an apparatus and a method for monitoring the transit time of transported articles, with which apparatus and method the transport means, transport events and types of movement occurring during shipping time can be identified.

In accordance with the invention, this object is accomplished by the features of claims 1 and 14. Advantageous embodiments of the invention ensue from the description and the dependent claims.

In accordance with a preferred embodiment of the invention, in a monitoring device having a movement sensor whose measured values are stored and supplied to an evaluation device, measured values of the sensor are each digitized with a predetermined cycle length T, and a predetermined number k of frequency spectra are determined from a predetermined number of N measured values, whereupon an integration of the k frequency spectra is effected and the integrated frequency spectra are stored in a memory.

The invention can also be embodied to include the use of a narrow-band band-pass filter for determining the frequency spectra.

In particular, the invention permits an energy-saving and memory-space-saving evaluation of the measured sensor values.

An adaptation of the sensitivity of the method to the movement energy is made possible in that the number k of frequency spectra over which integration takes place is reduced with increasing movement energy.

In a preferred embodiment of the invention, a frequency spectrum is only calculated if the movement energy is greater than a predetermined minimum movement energy $s_m$, which can be effected in a particularly energy-saving manner.

An especially simple measure for the movement energy is the sum of the amounts of distances between consecutive measured values, or the scatter of consecutive measured values during a predetermined measuring interval.

A further reduction in the memory requirement is achieved with nonlinear compression of the integrated spectra.

An adaptation of the value of the minimum movement energy with constant sensitivity is achieved by parametric adaptation.

An optimum temporal utilization of the available battery energy is achieved in that the number k of frequency spectra over which integration takes place and the cycle length T are controlled as a function of the supply voltage of the utilized testing device, which voltage is measured under the load of the movement sensor.

To take into consideration a loss in capacity of the battery used for energy supply, which is particularly possible at low temperatures, if a predetermined value of the supply voltage is not met, the movement sensor is deactivated, and is not reactivated until the supply voltage has assumed a second predetermined value.

The invention is illustrated below by way of example in conjunction with drawings.

Figure 2:
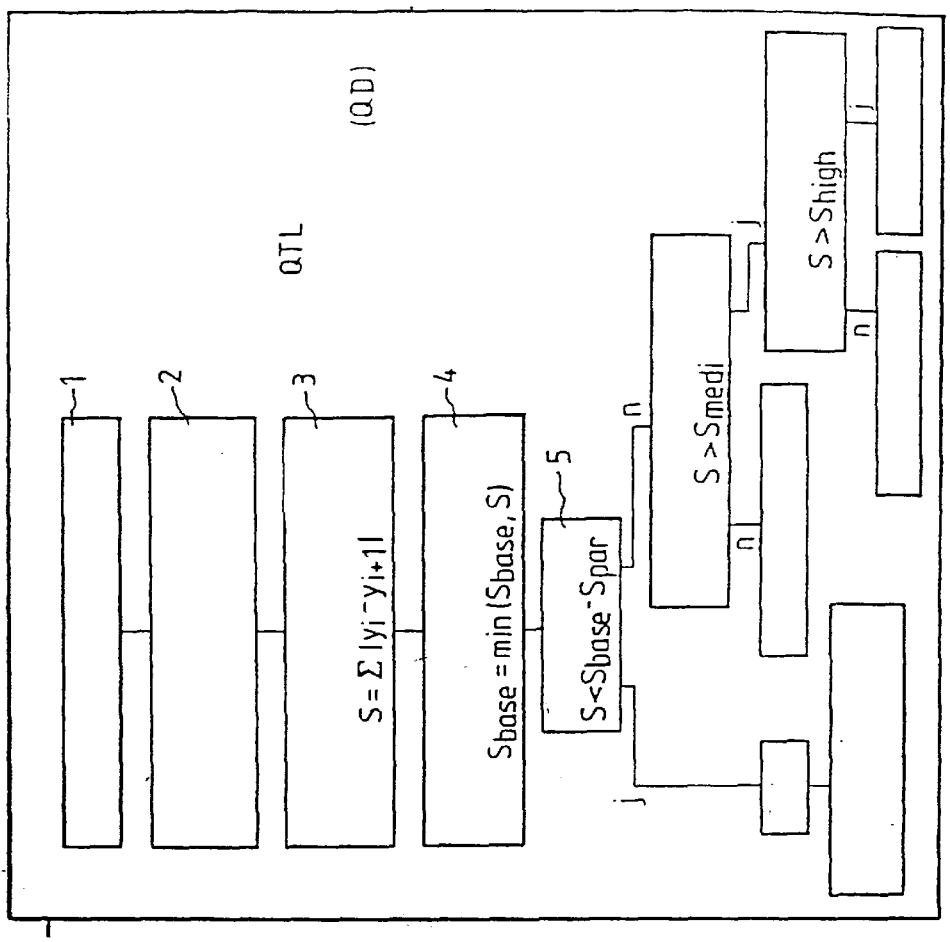
Figure 2:
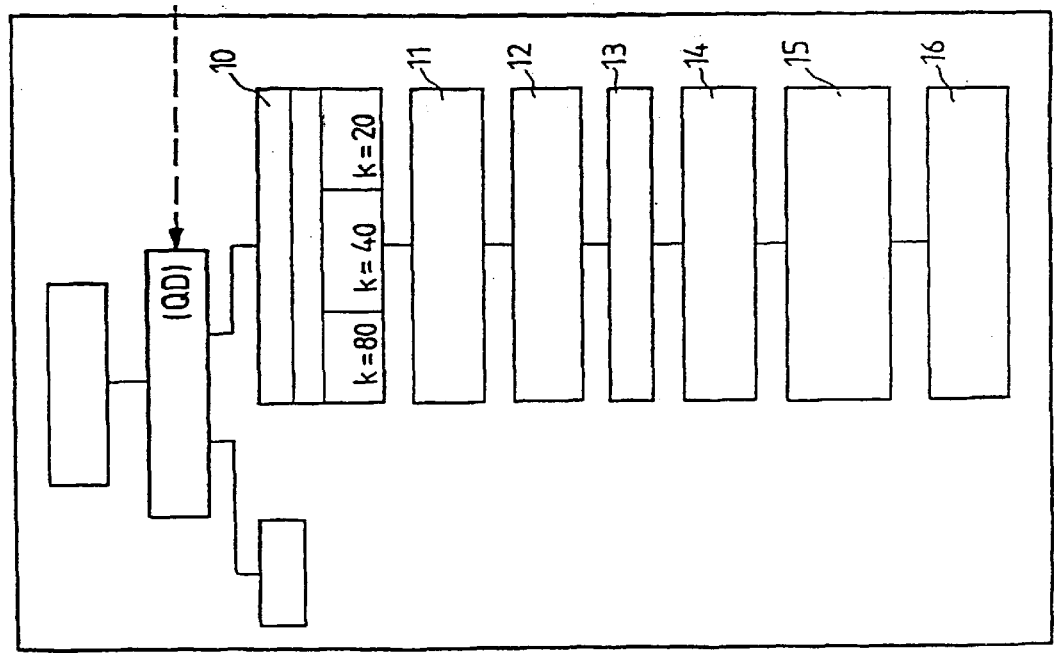
Figure 3:
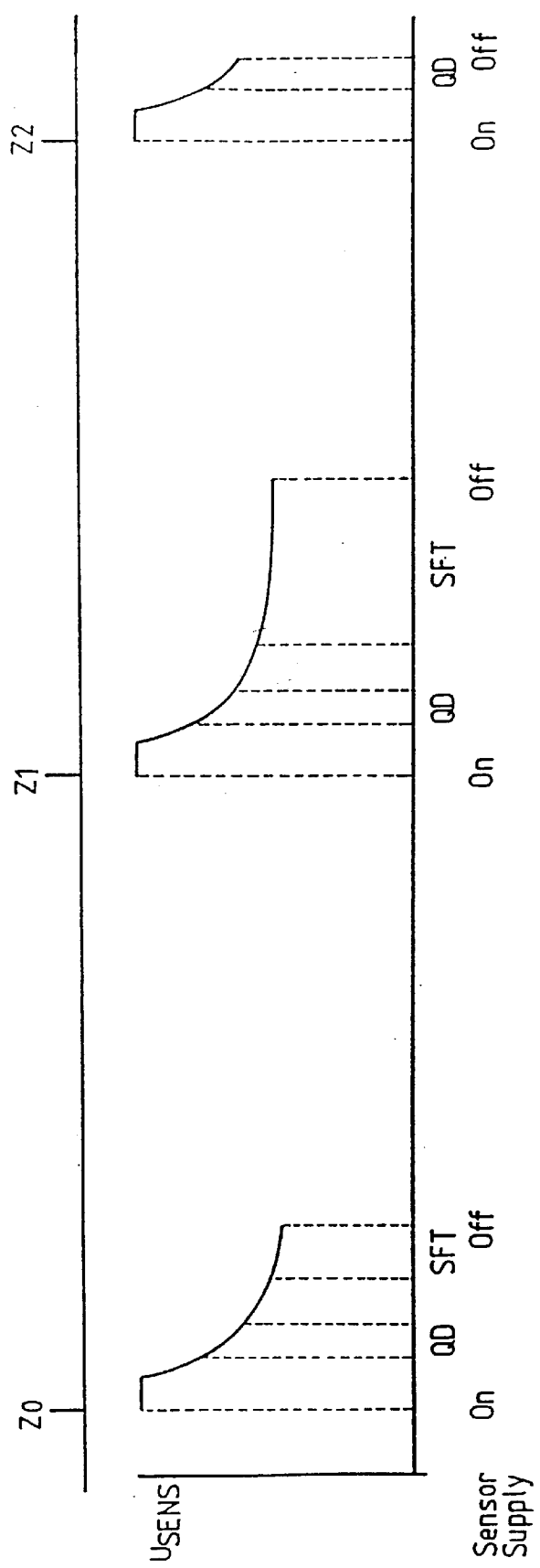
Figure 4:
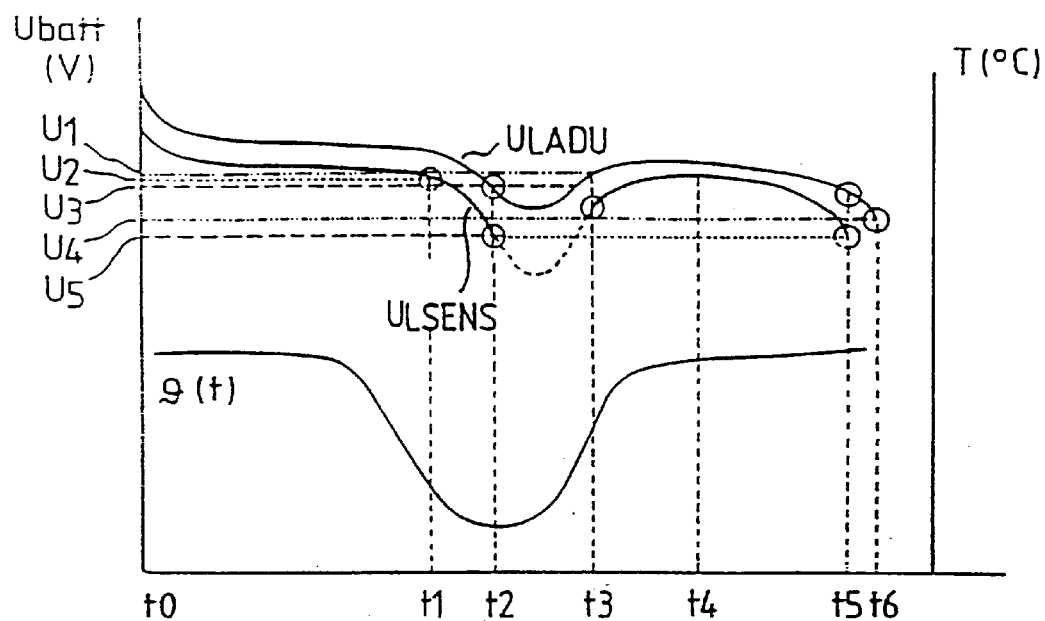
Figure 5:
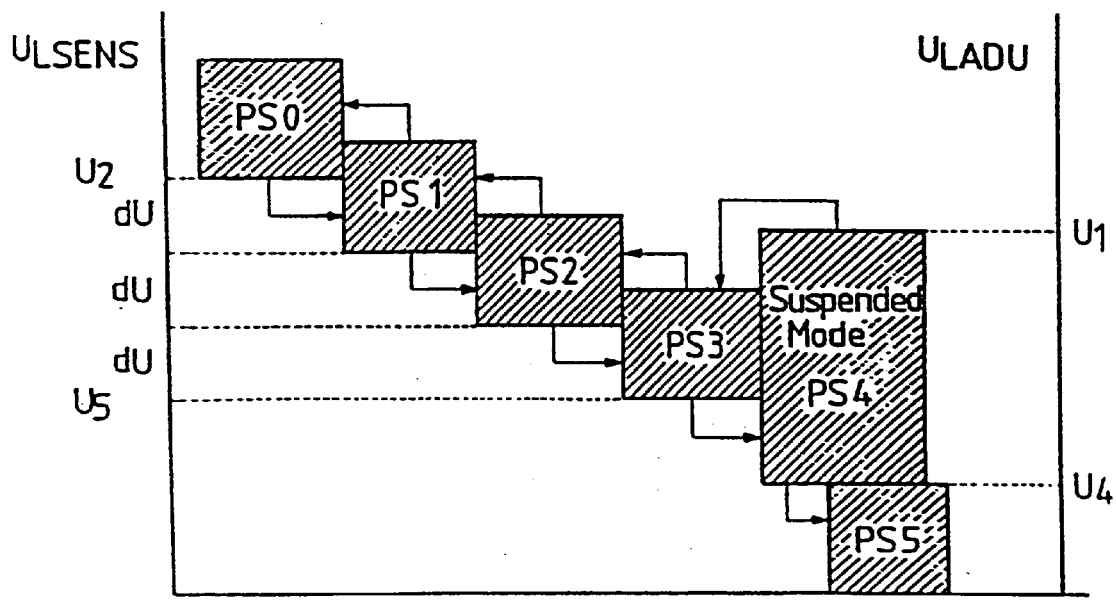

FIG. 1A, FIG. 1B, FIG. 1C and FIG. 1D, respectively, show the integrated intensity spectra of a run during which the mailbox is emptied, road transport, a flight and a delivery, respectively, FIG. 2 shows a flow chart of the calculation of frequency spectra as a function of intensity, FIG. 3 shows a representation of different sensor cycles as a function of intensity, FIG. 4 shows the voltage path with an automatic check of power consumption, and FIG. 5 shows the transitions between states which are associated with the voltage path in FIG. 4.

In a preferred embodiment of the invention, the apparatus comprises an acceleration sensor and a microcontroller having an integrated analog/digital converter and a memory, particularly a RAM. So that the apparatus is processed in letter-sorting machines and not rejected in the letter-processing machines in the post offices upon measurement of its rigidity, it is advantageous to configure it in the format of a C6 standard letter. The movement sensor emits a sensor signal that is proportional to the acceleration and is digitized by the analog/digital converter (ADU). The signal is further processed in the microcontroller by means of Fourier transformation to form frequency spectra that are stored in compromised form in the memory. Once the measured values have been recorded, the stored spectra are read out and evaluated. In the process, a temporal allocation of the frequency spectra to the temporal path of movement of the apparatus during transport is effected. Because the different transport media, for example automobiles, trains, transport on foot, and aircraft, respectively exhibit characteristic spectral paths, it is possible to identify the temporal course of the transport process.

FIG. 1A, FIG. 1B, FIG. 1C and FIG. 1D, respectively, show characteristic intensity spectra for four types of transport, namely a mailbox-emptying run, road transport, flight and delivery. In addition to an identification of the transport medium or the type of transport, the spectra also permit identification of the respectively occurring transport events, such as departure, arrival, changes in speed, etc., since these are reflected in certain oscillation characteristics of the transport means that are recorded by the apparatus of the invention. The use of spectra having frequencies of 8, 16, 24 and 32 Hz has proven particularly advantageous.

An embodiment of the method of the invention is described in detail below. According to the flow chart in FIG. 2, the method is performed cyclically, for example with cycle times of T=60 seconds. After the cycle has begun, first a state of rest is detected. If a letter is transported over several days, the resting state constitutes a substantial proportion of the total transport time, and can account for 50 to 95 percent. Therefore, recognition of this state is of great significance. The detection of rest can also be effected essentially with the aid of an evaluation of the spectral functions; however, detection with a separate detection method or a separate rest detector has the advantage of greater speed and possibly greater sensitivity, and therefore a lower energy requirement relative to the sensitivity.

At the beginning of the cycle, the supply voltage of the sensor is turned on, and the system waits until a predetermined initial voltage value of the sensor has been reached. It is taken into consideration that the sensor resonates with a characteristic resonating time $T_s$ according to an exponential function. The time to be selected as the resonating time of the sensor should be, for example, the time between the application of the sensor supply voltage and the resonance of the initial sensor voltage at ½ of the LSB (least significant bit) of the stationary end value. Rest detection takes place in the front part of the resonance curve. The rest detection should be effected with the greatest possible sensitivity, so that the state of movement can be reliably identified, even at low movement intensities. On the other hand, the calculation of spectral functions is not necessary in this range. Therefore, the total energy of the sensor signal is utilized for detecting rest. The scatter (square of the standard deviation) of the sensor signal at a defined measuring interval, or also the curvature, i.e., the sum of the distances between consecutive measured values within a defined measuring interval, are measures for the total energy. With the latter measure, the curvature of the resonance curve is a function of the degree to which the sensor is excited to oscillate.

The flow chart according to FIG. 2 presents a summation over distances between N sampling rates.

$$S = \sum_{i=1}^{N} |y_i - y_{i+1}|$$

A state of rest is assumed if $S < S_{TH}(N)$.

The sensitivity of the movement detection is a function of how closely $S_{TH}(N)$ approaches S (rest), the absolute rest curvature value.

After detection of rest has taken place in the front part of the resonance curve of the sensor, the spectral function is calculated in the part behind it, so that once the rest detector has recognized "movement," the spectra are determined in the same sensor cycle. In this case, the rest detector and the calculation of the spectral function must be matched to one another such that a state of movement recognized by the rest detector is confirmed as a spectrum different from 0. A stable function of the rest detector with high sensitivity can be achieved by an automatic parameter adaptation of $S_{TH}(N)$. To this end, $S_{TH}$ is separated into two terms:

$$S_{TH}(N) = S_{base} + S_{par}$$

$S_{base}$ is the adapted base value of the threshold $S_{TH}(N)$, while $S_{par}$ is the component whose parameters are constant and which determines the sensitivity of the movement detection. The adaptation of the base value $S_{base}$ is effected after each calculation of the curvature S by determining the minimum from the previous $S_{base}$ and the current curvature value S.

$$S_{base} = \min(S_{base}, S)$$

With this parameter adaptation, the base value of the threshold $s_{th}(N)$ is always maintained optimally at the rest curvature value. The consistency between detection of rest and calculation of the spectra is ensured in that the base value of the threshold is increased by 1 for the case that the spectra all yield an intensity 0 once the rest detection has identified movement. This can also be the case if the base value of the threshold $S_{base}$ has drifted lower, or if a short-time movement only occurs during the detection of rest and no movement occurs during the later measuring period for spectrum calculation. If, in the latter case, the base value is erroneously increased, a correction is performed during rest detection during the following cycle and the associated parameter adjustment.

The test at rest 5 follows the calculation of the energy mass S and the parameter adjustment of the base value $S_{base}$. If the result of this test is positive (j), the sensor supply voltage is switched off. In a negative case (N), a test is performed at medium intensity, $S > S_{medi}$, where $S_{medi}$ is a predetermined value that characterizes a medium movement energy. If the test result is negative (N), integration is effected over a predetermined number of spectra that are characteristic at a low intensity. If the result of this test is positive (j), a test is subsequently performed at high intensity, $S > S_{high}$; with a negative test result, the movement is classified as being of medium intensity, whereas it is classified as being of high intensity if the result is positive (j).

Depending on whether the intensity has been classified as small, medium or large, a large, medium or small number of spectra are integrated. The integration over K spectra for respectively N sampling values corresponds to an averaging over K spectra, and reduces the effect of statistical fluctuations. Because the influence of such fluctuations is greater at lower intensities, or is reduced with an increasing intensity, the number of cumulative spectra having an increasing intensity can be reduced. For low intensities, the preferred number of spectra over which integration takes place is K=80; for medium intensities, K=40 and for high intensities, K=20.

Because the measured values are temporally discrete signals, the formation of the discrete Fourier transformation is preferably used, and the integration 11 is performed as an accumulation. It follows from the formation of the discrete Fourier transformation that, for the preferred case of four spectral lines F1, F2, F3 and F4, $F_m = Re_m + Im_m$, where $M = 1, \ldots, 4$, always comprises a real component and an imaginary component. The real and imaginary components $Re_m$ and $Im_m$ of the spectral lines are then represented from consecutive sampling values $F_0, F_1, \ldots F_7$ as follows:

$$Re_1 = F(f_0 - f_4) + F \cos(\pi/4)(f_1 + f_7 - f_3 - f_5)$$

$$Im_1 = F(f_2 - f_6) + F \cos(\pi/4)(f_1 + f_3 - f_5 - f_7)$$

$$Re_2 = F(f_0 - f_2 + f_4 - f_6)$$

$$Im_2 = F(f_1 + f_5 - f_3 - f_7)$$

$$Re_3 = F(f_0 - f_4) + F \cos(\pi/4)(f_3 + f_5 - f_1 - f_7)$$

$$Im_3 = F(f_6 - f_2) + F \cos(\pi/4)(f_1 + f_3 - f_5 - f_7)$$

$$Re_4 = F(f_0 + f_2 + f_4 + f_6 - f_1 - f_3 - f_5 - f_7)$$

$$Im_4 = 0$$

In this instance, F is a factor suitable for being selected to minimize the rounding error (F≈16).

The spectral integration 11 is performed through a summation of the individual spectral components of $|F_{m\ i}|$ over K spectra.

$$SF_m = \sum_{i=1}^{k} |F_m|_i$$

It is advantageous to form the amount in an approximation that requires no squaring or taking of a root.

$$|F_m| = \max(|Re_m|, |Im_m|)$$

The dynamic range of the intensities is in an order of magnitude of $10^5$. It is therefore advantageous to subject the integral spectral lines to a nonlinear compression 13 in order to reduce the memory requirement necessary for storing the spectra, and thereby also reduce the dynamic range by an order of magnitude of $2^4$. This permits a combination of two spectral lines to form a byte in the memory. In a preferred embodiment, the compression is performed to result in a table look. The values for the compression table are determined according to an exponential function, $$g(n) = AW * b^n$$

The resulting compression table is as follows:

| n | g (n) |
|---|---|
| 0 | AW * $b^0$ |
| 1 | AW * $b^1$ |
| 2 | AW * $b^2$ |
| . | . |
| . | . |
| . | . |
| 14 | AW * $b^{14}$ |

Here AW is the entry of lowest value in the table. It determines the lower limiting sensitivity of the system. The entry of highest value is $AW \cdot B^{14}$. The dynamics of the compression table is determined by B, and can be calculated from AW and $AW \cdot B^{15}$. Once the nonlinear compression 13 has been performed, the spectra 14 are stored, preferably in a RAM.

As already mentioned in connection with the parameter adjustment of the base value, it is advantageous to couple the result of the Fourier transformation back to the base value of the threshold in order to achieve an optimum synchronization of the response threshold between the rest detector and the Fourier transformer. This parameter adjustment 15 follows the storage of the spectra in the RAM. After the parameter adjustment has been performed, the voltage supply of the sensor is shut off for this cycle at 16.

FIG. 3 shows three different sensor cycles: a cycle of high intensity, one of low intensity and one that includes rest detection QD. It can be seen that, at a high intensity, both the rest detection and the Fourier transformation take place in the resonance range of the sensor or the sensor voltage $U_{sens}$. At a low intensity, at which integration takes place over a larger number of measured values, the Fourier transformation takes place in the rear parts of the resonance curve. After rest detection has been performed, in contrast, the sensor voltage is already shut off directly after QD has ended.

FIG. 4 illustrates the no-load voltage of the battery used for voltage supply in an apparatus of the invention, and the battery voltage under the load of the sensor $U_{lsens}$ when the temperature changes as a function of time T. To take into account a reduced battery capacity, it is advantageous to adapt the power consumption of the apparatus to the momentarily available capacity, or to the measured voltages. This advantageously achieved by adapting the number of spectra over which the summation is performed, or the cycle times or the number of evaluated measured values, or both, to the battery capacity.

The following table illustrates a preferred, tempature-dependent adaptation of power.

| Power State (PS) | Characteristics | Cycle[s] | Max. Integration |
|---|---|---|---|
| 0 | Normal Operation | 60 | 80 |
| 1 | Reduced Power Operation 1 | 60 | 20 |
| 2 | Reduced Power Operation 2 | 4 * 60 | 20 |
| 3 | Reduced Power Operation 3 | 16 * 60 | 20 |
| 4 | Suspended Power Operation | 16 * 60 | Sensor off |
| 5 | Ultimate Sleep Mode | off | Sensor off |

Power states PS of differing cycle lengths and number of spectra over which integration takes place correspond to the different voltages. In principle, in the temperature-controlled power adaptation, the power consumption is reduced it the voltage $U_{LSENS}$ falls below the limiting voltage U2.

In FIG. 4, the measured load voltage $U_{LSENS}$ is initially greater than $U_2$, and the apparatus is in the PS 0 normal state. The instantaneous energy consumption is determined by the current movement intensity. The cycle time is always 60 seconds; during non-operative times, the apparatus is in the resting state, and during movement a total spectrum is calculated from 20, 40 or 80 spectra as a function of the movement intensity.

If $U_{LSENS}$ drops below $U_2$, the apparatus changes over to PS 1, in which the power consumption is reduced. The system remains in PS 1 as long as the measured voltage $U_{LSENS}$ is not less than U2−dU and not greater than U2+H. The parameter H as a hysteresis will prevent the system from starting to oscillate during the transition from PS1 to PS0.

The following relationships apply in general for the transition between states: transition to PS (i+1) if $U_L < U_2 - i$ dU transition to PS (i−1) if $U_L > U_2 - (i-1)$ dU+H If the current load voltage $U_{LSENS}$ falls below the limit value U5, with U5=U2−N·du, a transition to the so-called suspended mode (PS4) is made at time t2. In the suspended mode no further sensor activities are performed, and the remaining battery capacity is reserved for storing the data.

In the suspended mode, a measurement of the battery voltage $U_{LADU}$ is performed for a multiple of the usual cycle time, that is, no sensor load is present. Consequently, $U_{LADU}$ is greater than $U_{LSENS}$; refer to time t2 in FIG. 4. With the transition to suspended mode, the battery can regenerate within certain limits, because in this case it only has a small load to drive. This can lead to a rise in the no-load voltage without a real rise in the battery capacity being associated therewith. For this reason, the transition from suspended mode to PS 3 mode only takes place once the measured $U_{LADU}$ has risen by at least $dU_{ADU}=U1-U3$. This case is illustrated at time T3 in FIG. 4. The variable DOADU should be utilized as a parameter.

At the end of the battery service life, the stress during voltage measurement can lead to a breakdown in the battery voltage and thus endanger the data storage. Therefore, in the event that the measured battery voltage drops below a certain threshold value U4 in the suspended mode, a transition into an irreversible sleep mode PS5 takes place. There is no transition from this sleep mode to another power state; likewise, the time is registered just as little.

FIG. 5 shows a graphic outline of the transitions between states with automatically adapted power consumption of the apparatus of the invention.

I claim:

1. Method of monitoring the transit time of transported articles, in which the movement of a consignment is registered by a monitoring device equipped with an acceleration sensor, with the measured values of the sensor being stored and supplied to an evaluating unit, characterized in that a predetermined number of K frequency spectra comprising a predetermined number of M spectral lines is determined in a respectively predetermined cycle length T for a predetermined number of respectively N measured values, that the K frequency spectra are integrated so that at the end of each cycle length T precisely M integrated spectral lines are available, and that the integrated frequency spectra are stored in a memory, with the measured values being stored in the memory over the entire transit time of a transported article and being supplied to an evaluation at the destination of the transport for the reconstruction of the course of the transport.

2. Method according to claim 1, characterized in that the frequency spectra are determined with one or a plurality of band-pass filters.

3. Method according to one of claim 1, characterized in that the movement energy of the consignment is detected, and that a frequency spectrum is only detected if the movement energy is greater than a predetermined, minimum movement energy $S_m$.

4. Method according to claim 3, characterized in that the number K of frequency spectra over which integration takes place are reduced with increasing movement energy.

5. Method according to claim 3, characterized in that an adaptation of the value of the minimum movement energy $S_m$ is effected such that $S_m=S_{base}+S_{par}$ is set, with $S_{par}$ being a constant component that determines the sensitivity of the movement detection, and $S_{base}$ is recalculated after each calculation of S according to $S_{base}$ =Min ($S_{base}$, S).

6. Method according to claim 1, characterized in that the sum of the amounts of the distanced between consecutive measured values, or the scatter of consecutive measured values within a predetermined measuring interval, is used as a measure for the movement energy.

7. Method according to claim 1, characterized in that a nonlinear compression of the integrated spectra is effected before they are stored in the memory.

8. Method according to claim 1, characterized in that the number of frequency spectra over which integration takes place, and/or the cycle length T, is or are varied as a function of the supply voltage of the test device measured under the load of the movement sensor.

9. Method according to claim 8, characterized in that, when a predetermined value $U_5$ of the supply voltage is not met, the movement sensor is deactivated, that a measurement of the battery voltage $U_{LADU}$ takes place without sensor load and is only reactivated when $U_{LADU}$ exceeds a predetermined value.

10. Method according to claim 9, characterized in that, if the measured battery voltage drops below a predetermined value $U_4$, a transition into an irreversible sleep mode is effected.

11. Method according to claim 1, characterized in that K is set to equal 20 or 40 or 80.

12. Method according to claim 1, characterized in that spectra of frequencies of 8, 16, 24 and 32 Hertz are used.

13. Method of monitoring the transit time of transported articles, in which the movement of a consignment is registered by a monitoring device equipped with an acceleration sensor, with the measured values of the sensor being stored and supplied to an evaluating unit, characterized in that the measured values are digitized in a respectively predetermined cycle length T and a predetermined number K of frequency spectra comprising a predetermined number of M spectral lines is calculated from a predetermined number of respectively N measured values, that the K frequency spectra are integrated so that at the end of each cycle length T precisely M integrated spectra lines are available, and that the integrated frequency spectra are stored in a memory over the entire transit time of a transported article and being supplied to an evaluation at the destination of the transport for the reconstruction of the course of the transport.

14. Apparatus for implementing a method for monitoring the transit time of transported articles, in which the movement of a consignment is registered by a monitoring device equipped with an acceleration sensor, with the measured values of the sensor being stored and supplied to an evaluating unit, characterized in that the measured values are digitized in the evaluating unit in a respectively predetermined cycle length T and a predetermined number K of frequency spectra is calculated from a predetermined number of respectively N measured values, with each frequency spectrum comprising a predetermined number of M spectral lines, that the K frequency spectra are integrated, and that the integrated frequency spectra are stored in a memory, with the evaluating unit being provided with a device for determining and storing a predetermined number of integrated frequency spectra of the measured values of the movement sensor.

15. Apparatus according to claim 1, characterized in that the evaluation device includes a device for compromising the integrated frequency spectra before they are stored.

16. Apparatus according to claim 15, characterized in that the evaluating unit includes a device for adaptation of the power consumption as a function of battery capacity, during which the number K of frequency spectra over which integration is performed, and/or the number of evaluated measured values, is varied.

17. Apparatus according to claim 1, characterized in that states of rest or movement of predetermined movement energy are detected by the evaluating unit.

* * * * *